US010922269B2

(12) United States Patent
Krishnan et al.

(10) Patent No.: US 10,922,269 B2
(45) Date of Patent: Feb. 16, 2021

(54) PROACTIVE OPTIMIZATIONS AT MULTI-TIER FILE SYSTEMS

(71) Applicant: Amazon Technologies, Inc., Seattle, WA (US)

(72) Inventors: Karthikeyan Krishnan, Sammamish, WA (US); Abdul Sathar Sait, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 278 days.

(21) Appl. No.: 16/185,416

(22) Filed: Nov. 9, 2018

(65) Prior Publication Data
US 2019/0079940 A1 Mar. 14, 2019

Related U.S. Application Data

(63) Continuation of application No. 14/672,086, filed on Mar. 27, 2015, now Pat. No. 10,127,234.

(51) Int. Cl.
*G06F 16/11* (2019.01)
*G06N 20/00* (2019.01)
*G06F 16/18* (2019.01)
*G06F 16/9032* (2019.01)

(52) U.S. Cl.
CPC .......... *G06F 16/119* (2019.01); *G06F 16/122* (2019.01); *G06F 16/1847* (2019.01); *G06F 16/90324* (2019.01); *G06N 20/00* (2019.01)

(58) Field of Classification Search
CPC .. G06F 16/119; G06F 16/122; G06F 16/1847; G06F 16/90324; G06N 20/00

USPC .......................................................... 707/602
See application file for complete search history.

(56) References Cited

U.S. PATENT DOCUMENTS

| 7,225,211 | B1 | 5/2007 | Colgrove et al. |
| 8,706,701 | B1 | 4/2014 | Stefanov et al. |
| 8,706,755 | B2 | 4/2014 | Patel et al. |
| 8,732,307 | B1 | 5/2014 | Zhu et al. |
| 8,762,456 | B1 | 6/2014 | Chan et al. |
| 8,799,413 | B2 | 8/2014 | Taylor et al. |
| 8,799,414 | B2 | 8/2014 | Taylor et al. |
| 9,015,082 | B1 | 4/2015 | Jaiswal et al. |
| 9,584,395 | B1 | 2/2017 | Rapoport et al. |
| 10,339,455 | B1 * | 7/2019 | Parush-Tzur ............ G06N 5/04 |
| 2008/0313109 | A1 * | 12/2008 | Machulsky ........... G06F 3/0671 706/12 |
| 2009/0171889 | A1 | 7/2009 | Friedlander et al. |
| 2009/0192965 | A1 | 7/2009 | Kass et al. |

(Continued)

OTHER PUBLICATIONS

U.S. Appl. No. 14/570,930, filed Dec. 15, 2014, Karthikeyan Krishnan.

*Primary Examiner* — Evan Aspinwall
(74) *Attorney, Agent, or Firm* — Robert C. Kowert; Kowert, Hood, Munyon, Rankin & Goetzel, P.C.

(57) ABSTRACT

A recommendations manager (RM) of a file system service identifies a file system object group (FSOG) for which proactive placement recommendations are to be generated using statistical analyses. Usage metrics collected from the FSOG are used to train a model. Predictions obtained from the model are used to generate a recommendation to transfer a file system object proactively from one storage device group of the service to another. The recommendations are provided to an object migrator of the service to initiate the transfer.

20 Claims, 10 Drawing Sheets

(56) References Cited

U.S. PATENT DOCUMENTS

| | | |
|---|---|---|
| 2010/0235843 A1 | 9/2010 | Appa et al. |
| 2012/0131591 A1 | 5/2012 | Moorthi et al. |
| 2012/0150773 A1 | 6/2012 | DiCorpo et al. |
| 2012/0331113 A1 | 12/2012 | Jain et al. |
| 2013/0080617 A1 | 3/2013 | Driesen et al. |
| 2013/0139152 A1 | 5/2013 | Chang et al. |
| 2013/0185530 A1 | 7/2013 | Puttaswamy Naga et al. |
| 2013/0246208 A1 | 9/2013 | Jain et al. |
| 2013/0305039 A1 | 11/2013 | Gauda |
| 2014/0068202 A1 | 3/2014 | Goddard |
| 2014/0136456 A1* | 5/2014 | Susarla ............... G06F 16/212 706/12 |
| 2014/0149461 A1 | 5/2014 | Wijayaratne et al. |
| 2015/0106820 A1 | 4/2015 | Lakshman et al. |
| 2016/0088006 A1 | 3/2016 | Gupta et al. |
| 2017/0187592 A1 | 6/2017 | Ghosh et al. |
| 2017/0264493 A1* | 9/2017 | Cencini ................ G06F 1/26 |

\* cited by examiner

| File system object 305 | Granularities of ML predictions obtained 325 | | | | |
|---|---|---|---|---|---|
| | Global 310A (all file systems, all users) | FS instance 310B (one file system) | Client/user-based 310C | Compute-instance based 310D | Location based 310E |
| Directory D1 | Yes | Yes | Yes | Yes | Yes |
| File F2 | Yes | No | No | Yes | Yes |
| Directory D3 | No | No | Yes | Yes | No |
| ⋮ | | | | | |
| File Fn | Yes | No | No | No | No |

Table 300

Create file systems at an intelligent file system service (FSS) using various groups or tiers of provider network storage devices with different performance and/or pricing properties; FSS control-plane components may be distributed across numerous provider network resources including instance hosts, dedicated control-plane servers, and/or machine learning (ML) service resources 901

Identify members of file system object groups (FSOGs) (e.g., single file systems, collections of file systems associated with respective clients or groups of clients, file systems accessible from particular compute instances, etc.) for which proactive placement recommendations are to be generated using ML techniques 904

Determine machine learning resource constraints (if any) for each FSOG – e.g., how much compute capacity can be expended for training, testing and executing models, how much training data is to be retained and for how long, etc. 907

Collect metrics (e.g., corresponding to time windows of selected durations) to be used for training/testing machine learning model(s) using selected ML methodology (e.g., regression, classification, or time-series modeling) for each FSOG 910

Train and test ML models using collected metrics and resources selected according to the constraints 913

Obtain predictions from models 916

Generate recommendations (e.g., for moving file contents from one storage tier to another based on anticipated I/O request rates, for initial placement of new file system content, or for transferring applications from one execution platform to another based on I/O-bound nature of application) 919

Transmit recommendations to appropriate control-plane components (e.g., object migrators) for implementation 922

FIG. 9

PROACTIVE OPTIMIZATIONS AT MULTI-TIER FILE SYSTEMS

This application is a continuation of U.S. patent application Ser. No. 14/672,086, filed Mar. 27, 2015, now U.S. Pat. No. 10,127,234, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine can be thought of as a software simulation acting as a distinct logical computing system that provides users with the illusion that they are the sole operators and administrators of a given hardware computing resource, while also providing application isolation among the various virtual machines.

In addition to providing virtualized compute servers, many network operators have implemented a variety of virtualized storage services with different types of access interfaces, different performance and cost profiles, and the like. For example, some storage services may offer block-level programmatic interfaces, while other storage services may enable clients to use HTTP (HyperText Transfer Protocol) or its variants to access storage objects. Some of the services may utilize primarily magnetic disk-based storage devices, while others may also or instead use solid-state drives (SSDs). Different levels of data durability, availability, and fault-tolerance may be achieved using different storage services. In at least some provider network environments, a variety of storage device types supported by the different storage services may be used for different objects of a given file system. Control-plane components of such file system implementations may have to solve the non-trivial optimization problem of determining how various file system objects should be placed and transferred among the different storage tiers in view of client goals for performance, availability, durability and cost.

BRIEF DESCRIPTION OF DRAWINGS

FIG. 9 is a flow diagram illustrating aspects of operations that may be performed by a recommendations manager of a file system service which implements automated transfers of file system objects across storage device groups, according to at least some embodiments.

Figure 1:
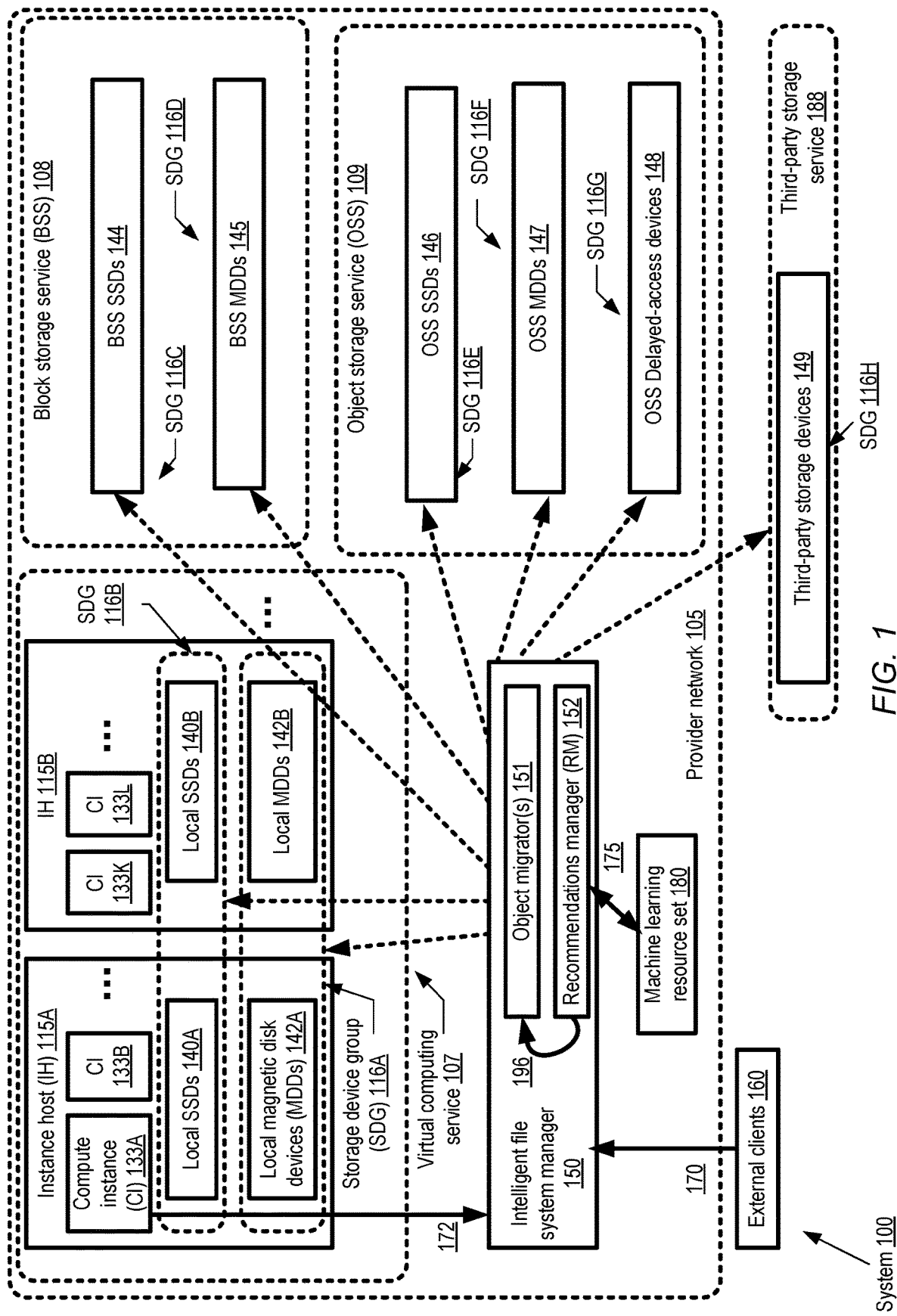
FIG. 1 illustrates an example system environment in which a recommendations manager of a file system service utilizes machine learning techniques to optimize transfers of file object contents among different storage device groups, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for using machine learning (ML) techniques to identify data placement optimizations at a file system service employing multiple tiers of storage devices of a provider network are described. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Provider networks may sometimes also be referred to as "public cloud" environments. The term "multi-tenant service" may be used herein to refer to a service that is designed to implement application and/or data virtualization in such a manner that different client entities are provided respective customizable, isolated views of the service, such that one client to whom portions of the service functionality are being provided using a given set of underlying resources may not be aware that the set of resources is also being used for other clients. For example, a multi-tenant virtualized computing service (VCS) may instantiate several different guest virtual machines on behalf of respective clients at a given hardware server, without any of the clients being informed that the hardware server is being shared with other clients. Guest virtual machines may also be referred to as "compute instances" or simply as "instances" herein, and the hardware servers on which one or more instances are resident may be referred to as "virtualization hosts" or "instance hosts". A provider network may typically include several large data centers hosting various resource pools, such as collections of physical and/or virtualized computer servers, storage devices, networking equipment, security-related equipment and the like, needed to implement, configure and distribute the infrastructure and services offered by the provider.

In at least some embodiments, in addition to virtualized computing services, one or more multi-tenant storage services may also be implemented at a provider network. For example, one such service may provide "volumes" of storage accessible via block-level device interfaces from the compute instances of the VCS. Such a service may be referred to herein as a "block storage service" or BSS. Another storage service may offer support for unstructured storage objects of arbitrary size that can be accessed via web services interfaces (e.g., utilizing URIs (Universal Resource Identifiers) to identify the storage objects to be accessed). The latter type of service may be referred to herein as an object storage service (OSS). A number of different types of storage media may be used within such storage services—for example, the BSS may use solid state drives (SSDs) for some subsets of its data and rotating magnetic disk drives (MDDs) for other subsets of its data. The instance hosts at which the compute instances are run may have their own local storage devices as well, which may also include several different storage device types. In one embodiment, a provider network may also use a set of computer hosts in un-virtualized mode, in which for example only a single operating system is set up on the "bare-metal" (un-virtualized) components of a given host, without using virtualization management software (such as hypervisors) to configure multiple compute instances with respective operating systems. Storage devices (e.g., SSDs and/or MDDs) attached locally to such un-virtualized hosts may constitute one or more additional storage device types in such embodiments. It may also be feasible in some embodiments to access storage devices outside a given provider network from a compute instance—e.g., third-party storage services may provide access to storage devices of various kinds that are located at external data centers, or clients may at least in principle be able to access storage devices that are located within client-owned premises.

In at least some embodiments, therefore, from a given compute instance it may be possible to store data to, and access data from, a variety of different storage devices, which may be either locally attached or network-accessible. Each of the different groups of local and/or service-managed storage devices may offer respective levels of performance (e.g., read/write operation throughputs and latencies), availability, data durability, and/or pricing/billing policies in some embodiments. Thus, for example, while it may make sense from a performance or pricing perspective to store a storage object at one tier of storage devices (such as locally-attached SSDs) when the object is created and is therefore likely to be accessed fairly frequently, it may also make sense to transfer the object to less expensive storage as it ages and is accessed less frequently. However, at least in some provider network environments, any given file system may be tied closely to a particular storage device tier and/or to a particular storage service—e.g., it may only be possible to store files of the file system at a block-level storage service, or at locally-attached storage at the compute instances.

In some embodiments, a provider network operator may implement an intelligent file system service that automatically and transparently transfers file system objects (such as files, directories, or entire file systems) between different storage device groups that are available. At least some of the transfers may be based on recommendations that have been generated using a variety of statistical analysis techniques in various embodiments. In one such statistical analysis, one or more types of machine learning (ML) models (e.g., regression models, classification models, time series models and the like) may be trained and tested with observation records comprising usage metrics collected for file system object groups at selected granularity levels (e.g., at a per file system instance level, at a client level, and so on). The trained models may infer statistical relationships (e.g., correlations) among various variables of the observation records, which may then be used to predict various characteristics of future accesses to the file system accesses, such as when a particular object is likely to be accessed next, or from which specific compute instance the next access to a particular object is likely to originate. On the basis of such predictions, proactive placement recommendations may be generated for various file system objects, and the objects may be moved or migrated from their current storage device group to different storage device groups without requiring clients to submit explicit requests for the migrations. It is noted that while in the remainder of this document, machine learning techniques are used as the primary example of the kinds of statistical analyses which may be used for generating proactive recommendations, other analytic techniques which may not be categorized as machine learning per se may be used with equal success in various embodiments. In at least one embodiment, ML-based recommendations may be used not just for migrating pre-existing content, but also for selecting the initial storage devices on which newly-created file system contents should be stored. From a typical user's perspective, a particular intelligent file system instance may appear to be similar to conventional file systems in some embodiments. For example, if a Linux-based or Unix™-based operating system is in use at a given compute instances, the same types of programmatic interfaces—e.g., commands like "mkfs" to create the file system, "mount" to attach to the file system, or "ls" to list contents of a directory—may be used to interact with an instance of an intelligent file system as would be used for other file systems. Additional command parameters or interfaces specific to ML-related aspects of the file systems may be supported in various implementations as described below in further detail. In some embodiments, the administrative components of the file system service may include, for example, a recommendations manager (RM) responsible for using ML to generate proactive recommendations, and various object migrators responsible for acting on the recommendations. The administrative or control-plane components of the file system service may collectively be referred to herein as the intelligent file system manager (IFSM). The IFSM may be distributed across various software and/or hardware entities of the provider network in at least some embodiments. For example, some components of the IFSM may be incorporated within the compute instances (e.g., at an operating system-agnostic layer or within the operating system being used), others may be implemented at a virtualization software stack at the instance hosts of the VCS, others may be included within the control planes of the different storage services, and/or at other servers or devices that are dedicated exclusively to administering the intelligent file systems.

In at least some embodiments, the RM may use distinct ML techniques for generating recommendations for different file system object groups (FSOGs). For example, in one embodiment, a baseline or default set of ML models may be utilized for objects belonging to all file system instances, while more detailed predictions may be generated for selected subsets of file system objects using additional models. The member objects (e.g., files, directories, or file system instances) of a given FSOG may be determined based on a variety of factors in different embodiments. In one example scenario, FSOG members may be determined based at least in part on input provided by clients of the file system service—e.g., a client may use a web-based console or some other programmatic interface to indicate a set of directories or files for which detailed predictions are desired, or some particular file system objects for which ML-based predictions and recommendations are not to be generated.

Depending on the granularity of the predictions desired and the amount of data used for training the models, ML techniques can be resource intensive, both in terms of storage/memory and in terms of computational effort. In some embodiments, the overhead associated with using ML to recommend file object placement may be minimized or controlled using a variety of flexible resource constraint policies. For example, the file system service may set a size limit on the amount of usage metrics data to be used as input to train an ML model for a given FSOG, and/or the amount of computational cycles to be used for training or testing the model. In one embodiment the resource constraints to be used for a given FSOG may change over time—e.g., as a file system instance grows in size, the limit on the ML resources that can be used for the FSOG may be increased. Time windows may be selected to limit the usage metric volume in some implementations, e.g., so that only metrics collected over the previous X hours or minutes may be used for training models. In at least one implementation, the observation records used to train a model may be assigned respective weights based on how recently the metrics were collected, e.g., under the assumption that more recent metrics are likely to be better predictors of accesses in the near future than metrics that were collected earlier. In one embodiment, clients of the file system service may be able to indicate respective resource constraints on the ML activities performed for their FSOGs. In at least one embodiment, separate resource constraints may not be applied on the ML resources used for different FSOGs; instead, a pool of ML resources may be set aside for the file system service as a whole, and resources from that pool may be allocated to FSOGs on a "best-effort" basis. In some embodiments, ML techniques may not necessarily be used for at least some file system objects; instead, relatively simple file content migration policies that take a few factors (such as recency of accesses) into account may be used for such objects.

One or more ML models may be trained using the resources selected (e.g., based on the applicable resource constraints) and the metrics collected for a given FSOG. A variety of modeling methodologies may be employed in various embodiments, such as linear regression, logistic regression, various types of classification techniques including regression trees, random forest models, and the like. In at least one embodiment, time series models such as ARIMA (auto-regressive integrated moving average) or exponential smoothing models may be used. In at least some implementations, the observation records corresponding to the collected metrics may be split into separate training and test data sets, and, after a model is trained, the test data sets may be used to evaluate the quality of the model's predictions. In embodiments in which multiple different models may be trained for a given FSOG, the particular model which provides the best predictions on a test data set may be selected for generating the predictions eventually used for the proactive recommendations. The collected metrics used for training the ML model(s) may include, for example, access metrics such as how often or how recently the object was read or written, as well as other metadata such as the size of the object, the number of distinct users that accessed the object, the rate at which the object grew or shrank, and so on.

The recommendations may, for example, include a proactive transfer of one file system object from a first storage device group (e.g., a set of devices with high average latency and low per-byte storage cost) to a second storage device group (e.g., with lower average latency and a higher per-byte storage cost) in view of a prediction that the object is likely to be referenced in the near future. For a different object, for which no accesses are predicted in the near future by the machine learning model, the RM may recommend a transfer from the second storage device group to the first. In some cases, as mentioned earlier, the RM may generate machine learning-based recommendations not just for the migration of existing file system content from one type of storage device to another, but also or instead for the storage device(s) at which newly-created file system content is initially stored. In at least one embodiment, the RM may also or instead generate application migration recommendations based on the machine learning models. For example, the RM may be able to use its ML models to deduce that a particular application App1 is file-I/O-bound—that is, the application's overall performance is limited by the performance achieved for its file system accesses, and not by the computing capacity (e.g., CPU count or speed) or other resources such as main memory. In such a scenario, the RM may recommend the transfer of App1 itself (not just files accessed by App1) to a different execution platform, such as a compute instance with a lower compute performance capability, which may reduce the costs to the client.

The recommendations generated for a given FSOG may be transmitted or provided to other file system service control-plane components (such as various processes or threads acting as object migrators) for implementation in at least some embodiments. In various embodiments, ML techniques may be applied iteratively for making file system placement decisions. For example, the RM may periodically (e.g., once every X minutes, where X may be a configurable parameter which may itself be modified as the RM learns more about the usage patterns of the corresponding FSOG) generate a set of recommendations, evaluate the effectiveness of the recommendations and/or collect additional usage metrics, re-train the ML models used (or train new ML models), and repeat the process. The migrations or transfers implementing the recommendations may be performed without receiving an explicit request from a client—that is, a client may not be aware that the IFSM is transferring contents of some files from one storage device to another—while maintaining an unchanged view or presentation of the file system contents to the client. For example, if the client lists the contents of F1's directory before or after the transfer using an "ls" or "dir" command, the same set of objects may be provided in the response in both the pre-migration and post-migration cases in at least some embodiments.

In one embodiment, the IFSM may support at least two accessibility modes for a given file system created on behalf of a client: a private accessibility mode, in which file system objects are to be accessed from a single compute instance, and one or more shared accessibility modes, in which objects of a given file system are to be accessed from multiple compute instances. ML techniques may be restricted to a subset of the supported accessibility modes in some embodiments, while in other embodiments the RM may generate proactive recommendations of the kind described above for all the accessibility modes. In some embodiments, the shared accessibility mode may in turn comprise additional sub-categories, such as clustered versus non-clustered shared file systems as described below. In various embodiments, software containers representing an additional layer of abstraction on top of compute instances (or on top of un-virtualized hosts' operating systems) may be implemented at a provider network. Thus, for example, a single compute instance may be used for multiple software containers, where each container represents a logically isolated execution environment, to be used for a set of applications that are to run independently of other applications in different containers of the same compute instance. Each container may have its own process trees, user identifiers, mounted file systems and the like, which may not be visible from other containers. Software containers (implemented within a given compute instance, an un-virtualized host's operating system, or spread across multiple instances or hosts) may also be provided access to file systems managed by the IFSM in some such embodiments. In different implementations, such container-based access may be considered a distinct accessibility mode by the IF SM, or may be regarded as a sub-category of one (or more) of the other accessibility modes. ML techniques Clients may indicate the accessibility mode they want for a particular file system as a parameter of a file system creation request in various embodiments. In at least one implementation, the IFSM may assign a default accessibility mode to a file system, e.g., if the client on whose behalf a file system is being created does not indicate a desired accessibility mode.

Decisions regarding the storage device group (or groups) at which a given file system object's contents are to be stored initially (i.e., when the object is populated with its first set of data), may be made based at least in part on the accessibility mode of the corresponding file system in some embodiments, in addition to or instead of the results of ML models. For example, in one embodiment, if an intelligent file system IFS1 has been created in private accessibility mode such that the files of IFS1 can be accessed from a compute instance CI1 running an instance host IH1, the contents of a given file F1 of IFS1 may initially be stored at locally-attached SSD-based storage of IH1 (unless the RM recommend otherwise). In some embodiments, the contents of F1 may also be stored or replicated at SSDs of a block-level storage service, so that for example F1 is not lost if the compute instance CD is terminated or if a failure occurs at IH1. If F1 were instead created within a different file system IFS2 in shared mode, the contents of F1 may initially be stored at one or more SSD or magnetic disk-based devices of a cluster CL1 of devices designated for IFS2 in some embodiments, where CL1 is accessible from numerous CIs including CI1 using an appropriate file system-level concurrency control mechanism.

Example System Environment

FIG. 1 illustrates an example system environment in which a recommendations manager of a file system service utilizes machine learning techniques to optimize transfers of file object contents among different storage device groups, according to at least some embodiments. As shown, system 100 includes a provider network 105 at which a plurality of network-accessible services are implemented. The services may include, for example, a virtual computing service (VCS) 107, a block storage service (BSS) 108, an object storage service (OSS) 109 and a file system service whose control-plane components may include the intelligent file system manager 150. The VCS 107 may include a plurality of instance hosts (IH) 115, such as IH 115A and 115B, each of which may be used for one or more guest virtual machines or compute instances (CIs) 133 launched on behalf of various clients in a multi-tenant or single-tenant mode. Thus, CIs 133A and 133B may be launched on IH 115A, while IH 115B may be used for CIs 133K and 133L.

The instance hosts and network-accessible services of provider network 105 may collectively include a variety of groups of storage devices, which may differ from one another in various characteristics such as the programmatic interfaces supported, performance capabilities, availability levels, data durability levels, pricing/billing policies, physical/geographical locations, security characteristics, and so on. For example, some or all of the instance hosts 115 may be configured with local storage devices, such as local solid state drives (SSDs) 140A and 140B at IH 115A and 115B respectively and/or local rotating magnetic disk devices (MDDs) 142A and 142B at IH 115A and 115B respectively. The local MDDs may be considered one example of a storage device group 116A, while the local SDDs (which may differ at least in performance capabilities from the MDDs) may be considered a second SDG 116B. The block storage service 108 may comprise at least two SDGs 116C (comprising SSDs 144) and 116D (comprising MDDs 145) in the depicted embodiment. The OSS 109 may comprise at least three SDGs in the depicted embodiment: SDG 116E comprising SSDs 144, SDG 116F comprising MDDs 145, and SDG 116G comprising delayed-access devices 146 such as disk-based or tape-based devices with longer average response times for I/O operations than the MDDs of SDG 116F. Delayed-access devices 146 may be used, for example, at least in part as archival storage for objects that are not expected to be accessed frequently relative to the objects stored at the other SDGs. In addition to the SDGs available within the provider network 105, in at least some embodiments the CIs 133 may also be able to access data stored at the storage devices 149 of third-party storage services 188 outside the provider network. External storage devices may be organized in one or more additional storage device groups such as 116H, with different interfaces, performance, availability, durability, pricing, and other characteristics relative to the SDGs within the provider network (or relative to other third-party SDGs). Thus, a wide variety of storage devices and locations may be accessible from compute instances 133 in the depicted embodiment, collectively offering a far wider range of storage-related capabilities and features than may be available on the instance hosts of the compute instances.

The file system service comprising intelligent file system manager (IFSM) 150 may enable easy-to-use file systems to be set up on behalf of various clients, such that individual objects of the file systems may be transparently moved between SDGs in accordance with various optimization criteria and/or machine learning (ML) predictions without requiring explicit instructions or guidance from the clients as to when or where a given object should be moved. The IFSM may comprise various administrative or control-plane components of the file system service implemented at provider network 105 in the depicted embodiment. In the embodiment illustrated in FIG. 1, the IFSM includes a recommendations manager (RM) 152 configured to utilize machine learning resource set 180 to generate proactive placement recommendations (e.g., based on collected usage metrics) for various file system objects as described in greater detail below. At least some of the recommendations may be transmitted by the RM 152 to one or more object migrators 151 (as indicated by arrow 196) of the IFSM for implementation.

It is noted that although the IFSM 150 is shown as a single entity in FIG. 1, components of the IFSM may be distributed among various entities of the provider network 105 in various embodiments, including the instance hosts, resources of the storage services and/or other devices. In at least one embodiment, file system usage metrics that are used to train machine learning models may be obtained from operating-system-agnostic tracing modules installed at some or all of the compute instances utilizing the file system service. In one embodiment, a machine learning service implemented at the provider network may be used by the RM as well as by other clients—that is, the ML resource set 180 may be used for multiple purposes by a variety of clients including the RM. In other embodiments, a dedicated set of ML resources 180 may be designated for the file system service alone.

In various embodiment, the RM 152 may identify or delineate one or more file system object groups (FSOGs), each comprising a set of files, directories or file system instances, and generate respective sets of proactive placement recommendations for the different FSOGs based on respective sets of collected metrics. One such recommendation may, for example, indicate that a particular file likely to be accessed in the near future should be proactively transferred to an SDG with a lower access latency than the access latency that would be achieved if the particular file were left in its current SDG. In contrast, the RM 152 may recommend moving files that are not expected to be accessed in the near future to "colder" (and in at least some cases less expensive from the client's perspective) storage than their current locations. In at least one embodiment, the RM 152 may be able to generate higher-level recommendations regarding potentially beneficial transfers of applications—e.g., the RM may be able to use its ML models to deduce that a client would be able to save billing costs if an I/O-bound application were transferred from a more powerful compute instance to a less powerful compute instance.

A given file system object may belong to more than one FSOG in at least some cases, and may therefore benefit from recommendations generated at several different granularities. For example, in one implementation, the RM 152 may designate all the file system objects of several different individual file systems as one FSOG, a particular file system instance as a second FSOG, and files of a particular directory within the particular file system as a third FSOG. Respective machine learning models may be trained using metrics collected at the three different levels of granularity in this example scenario, and corresponding placement recommendations may be generated using the models' predictions. In some embodiments, when a given object belongs to several different FSOGs, only the recommendations generated at the smallest FSOG among the different FSOGs may be implemented by the object migrators 151, e.g., under the assumption that the most fine-grained predictions (based on the metrics collected for objects most closely related to the object) are likely to be the most accurate. In other embodiments, the RM may generate combined or prioritized recommendations using the predictions generated by several different models used for the different FSOGs.

File system accesses (e.g., file reads and writes) are typically lightweight operations, whereas training and running ML models can potentially be fairly resource intensive. In order to limit the overhead associated with generating the ML-based recommendations, various types of resource constraint policies may be enforced in some embodiments. For example, in some embodiments, a machine learning resource budget (e.g., in terms of CPU time, disk space, memory and the like) may be designated for each FSOG, or for combinations of several or all the FSOGs, and the RM 152 may ensure that such budgets are not exceeded when training/testing the ML models. In at least some embodiments, the RM may take such resource constraints into account when selecting the ML modeling methodology to be employed for an FSOG—e.g., some relatively simple regression models may be less resource-intensive than more complex random forest classification models. A variety of factors which may be taken into account by an RM 152 when generating respective machine learning plans are described in further detail with respect to FIG. 2. The RM 152 may generate its recommendations iteratively (e.g., once every X seconds, minutes or hours, depending on the FSOG size and various other parameters) in at least some embodiments, fine-tuning its ML models as more access metrics become available and the effectiveness of its earlier recommendations is determined.

In some embodiments, several different accessibility modes may be supported by the IF SM, including a private mode in which the contents of a file system are to be available only to a single compute instance, and one or more shared modes in which file system contents may be shared among multiple CIs 133. ML techniques may be used to optimize file accesses at any or all of the various accessibility modes supported in such embodiments. In some embodiments, the IFSM may store at least a subset of file system metadata (e.g., permissions, inodes, block maps or similar structures) within a repository that is distinct from the storage devices used for the data contents of the file system. In other embodiments, at least a subset of the metadata may also be transferred between SDGs.

Various transfers/migrations of file system objects (or portions of file system objects) may be made without notifying the clients on whose behalf the file system objects were created in at least some embodiments, and without changing the view of the file system contents that is provided to the clients. For example, if files F1 and F2 were created within a directory D1, regardless of which particular SDG file F1 or F2 happen to be located in at any given time, both files may still be included in a directory listing of D1 just as they would have been listed if they had remained in their original SDGs. In at least some embodiments, a file may initially be stored at an SDG which supports relatively quick response times, e.g., under the assumption that files are typically accessed most frequently shortly after they are created; later, if the file is not expected (e.g., based on ML predictions) to be accessed very frequently, it may be moved to a cheaper SDG with longer access times. If, after a file has been moved to a slower or more distant (e.g., in terms of the access latency) SDG, the file is accessed again, it may be moved back to an SDG that supports fast accesses, again without notifying or informing the client regarding the transfer. If the file then remains un-accessed for some time period, or meets transfer criteria being used by the IF SM, it may be moved again to a slower/cheaper SDG. Thus, over time, the contents of a given file system may be dispersed across various SDGs in accordance with the IFSM's optimization strategies and/or the RM's recommendations. In this way, the benefits of the wide variety of storage-related features available in cloud environments may be made available to file system clients while maintaining compatibility with traditional file system interfaces, thereby requiring little or no additional client effort relative to the amount of client effort required to use more restricted file systems.

Machine Learning Workflows

Figure 2:
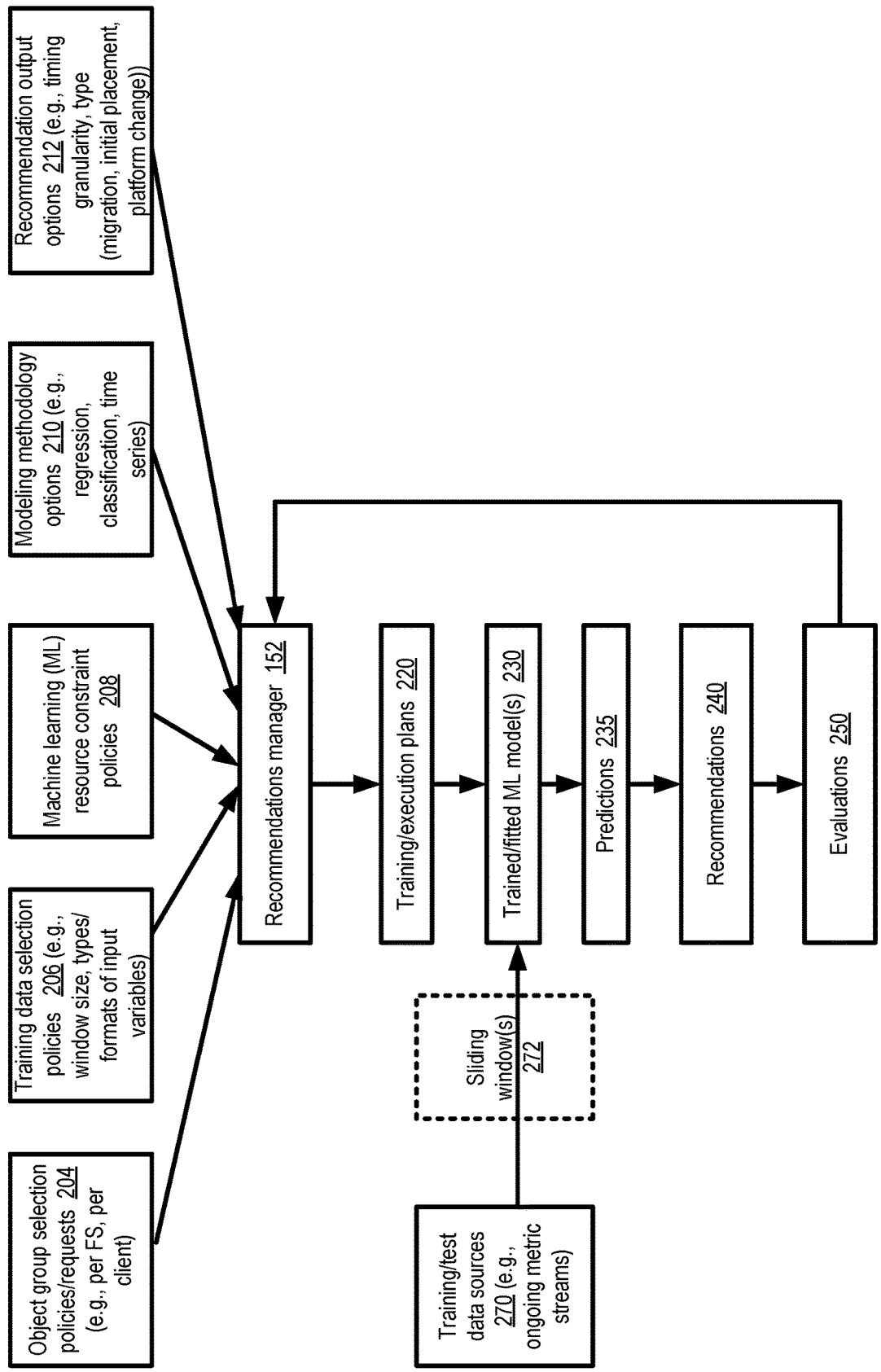
FIG. 2 illustrates an overview of machine learning workflows that may be initiated by a recommendations manager of a file system service, according to at least some embodiments.

FIG. 2 illustrates an overview of machine learning workflows that may be initiated by a recommendations manager (RM) of a file system service, according to at least some embodiments. The RM 152 may generate one or more ML training and execution plans 220 based on several factors in the illustrated embodiment. The boundaries or membership of the FSOGs for which respective recommendations are to be generated using a particular set of trained ML models may be selected, for example, based on a one or more object group selection policies 204 and/or on specific client requests. In one embodiment, the IFSM may define one or more FSOGs for which ML-based predictions are to be generated by default, e.g., without explicit client approval. Other FSOGs may be defined in response to programmatic requests or "opt-in" indications received from respective clients in such an embodiment. In some embodiments, ML techniques for optimizing file system operations may be utilized only in response to explicit client approvals of the type discussed below in the context of FIG. 8, and the FSOG members may be indicated in such client approvals.

In the embodiment shown in FIG. 2, training data selection policies 206 may guide the RM regarding the particular types of metrics that should serve as the input observation records for its ML models. The training data selection policies may include, for example, specifications for minimum/maximum time windows over which usage metrics are to be collected, the types and formats of data to be collected, and so on. For example, in one embodiment, the variables for which values are to be included in each observation record may comprise access type (read or write), access size (the number of bytes read/written), a request receive timestamp, a request completion timestamp, a requester process identifier, a requester compute instance identifier, a targeted device location indicating the SDG or specific storage device at which the requested content resides, and so on. ML resource constraint policies 208 may influence the selection of the particular servers or devices to be used for training and executing the ML models in some embodiments as discussed above.

In at least some embodiments, numerous ML modeling methodologies, such as various types of supervised and/or unsupervised learning algorithms may be utilized by an RM. The methodology options 210 may include, for example, regression (including linear regression and logistic regression), classification (e.g., including classification trees and/or random forests), time series forecasting modeling (e.g., ARIMA models, exponential smoothing models and the like), and so on. The particular methodology selected for a given FSOG or for a given iteration of predictions may be governed by, among other factors, the recommendation output options 212, which indicate the timing granularity for recommendations (e.g., whether recommendations are to be generated every 5 minutes, every hour, or once a day) and the kinds of recommendations that are to be provided (e.g., transfer/migration of pre-existing file components, initial placement decisions for newly-created objects, and/or execution platform change recommendations at the application level). Modeling methodology selection may also be influenced by the ML resource constraint policies 208 that are in effect.

The training/execution plans 220 may indicate the specific resources to be used for training one or more ML models in the depicted embodiment, using training/test data sources 270 (e.g., ongoing streams of collected metrics). In at least some embodiments, a windowing technique may be applied to limit the amount of training data used for a given iteration of predictions/recommendations, as indicated by sliding windows 272 in FIG. 2. One or more models 230 may be trained or fitted using the training data, and tested using a subset of the training data in at least some embodiments. Predictions 235 (e.g., the anticipated times and types of future accesses to objects of the FSOG within some prediction window) may be used by the RM to generate recommendations 240, which may be provided to object migrators and/or other control plane components associated with the file system service for implementation. Evaluations 250 of effectiveness or usefulness of earlier-generated recommendations may be performed in some embodiments—e.g., the RM may attempt to verify whether objects for which near-term accesses were predicted actually were accessed as anticipated, and whether objects for which no near-term accesses were predicted were not accessed as predicted. Feedback regarding the accuracy and value of the previous recommendations may be used to modify various ML parameters (or to select different ML models) for subsequent iterations in the depicted embodiment.

Recommendation Granularities

Figure 3:
FIG. 3 illustrates examples of different granularities at which machine learning predictions may be generated for various file system objects, according to at least some embodiments.

As mentioned earlier, the RM may use respective sets of input data to train models at several different granularities in some embodiments, and a given set of file system objects may consequently potentially benefit from predictions generated using multiple models. FIG. 3 illustrates examples of different granularities at which machine learning predictions may be generated for various file system objects, according to at least some embodiments. Table 300 includes respective rows for a plurality of file system objects 305, such as directories D1 and D3, and files F1 and Fn. For directory D1, predictions may be generated at five different granularities 325 in the depicted embodiment: at a global level 310A, at a file system instance level 310B, at a client level 310C, at a compute instance level 310D, and at a location-based level 310E. In at least some implementations, respective models may be trained using access or usage records collected at each of the granularity levels. For example, at the global level 310A, the RM may train one or more models with usage data collected from all the file system instances that have been established. At the file system instance level 310B, a model may be trained using only those usage records that are collected for objects of that particular file system. Given that the rate of file system accesses occurring collectively at all the file systems may be much higher than the rate at which accesses occur at a single file system instance, it may be possible to collect more detailed metrics at the file system instance level than at the global level, especially in view of ML resource constraints which may be in effect. Accordingly, more accurate predictions may typically be obtained at the file system instance level 310B than at the global level 310A.

In some embodiments, at least some ML models may be trained using client-specific or user-specific training data, as indicated by column 310C. For example, it may be the case that by examining only the set of file system accesses generated by a particular client process or a particular client thread, better predictions may be obtained regarding future accesses than could be obtained if the accesses of many different client processes/threads were examined collectively. Similarly, in some embodiments it may be the case that if file system accesses were segregated on the basis of the compute instances from which the accesses were requested (as indicated in column 310D), more accurate predictions may be generated than if accesses from multiple instances were used to train a single mode. In embodiments in which the storage devices of the various SDGs are dispersed among a variety of data centers in different cities, states or countries, models trained using location data (e.g., the geographical or data center locations of the requesting entities and/or the targeted file system objects) as indicated in column 310E may provide useful predictions.

An RM 152 may generate recommendations based on the combinations of predictions generated at several different granularities in various embodiments. For directory D1, for example, a selected subset or all five of the granularities shown may be used. Different combinations of granularities may be used for some file system objects than others in the depicted embodiment. For example, for file F2, predictions generated at the global level 310A, the compute instance level 310D and/or at the location level 310E may be used. For directory D3, only client-based and instance-based predictions may be use, while for file Fn, only global level predictions may be used. It is noted that table 300 may not actually be created or stored by the RM in the depicted embodiment—the table is simply intended to illustrate the concept that predictions may be generated at several different granularities in various embodiments, and that different combinations of granularities may be used for different file system objects in at least some such embodiments.

Machine Learning Service

Figure 4:
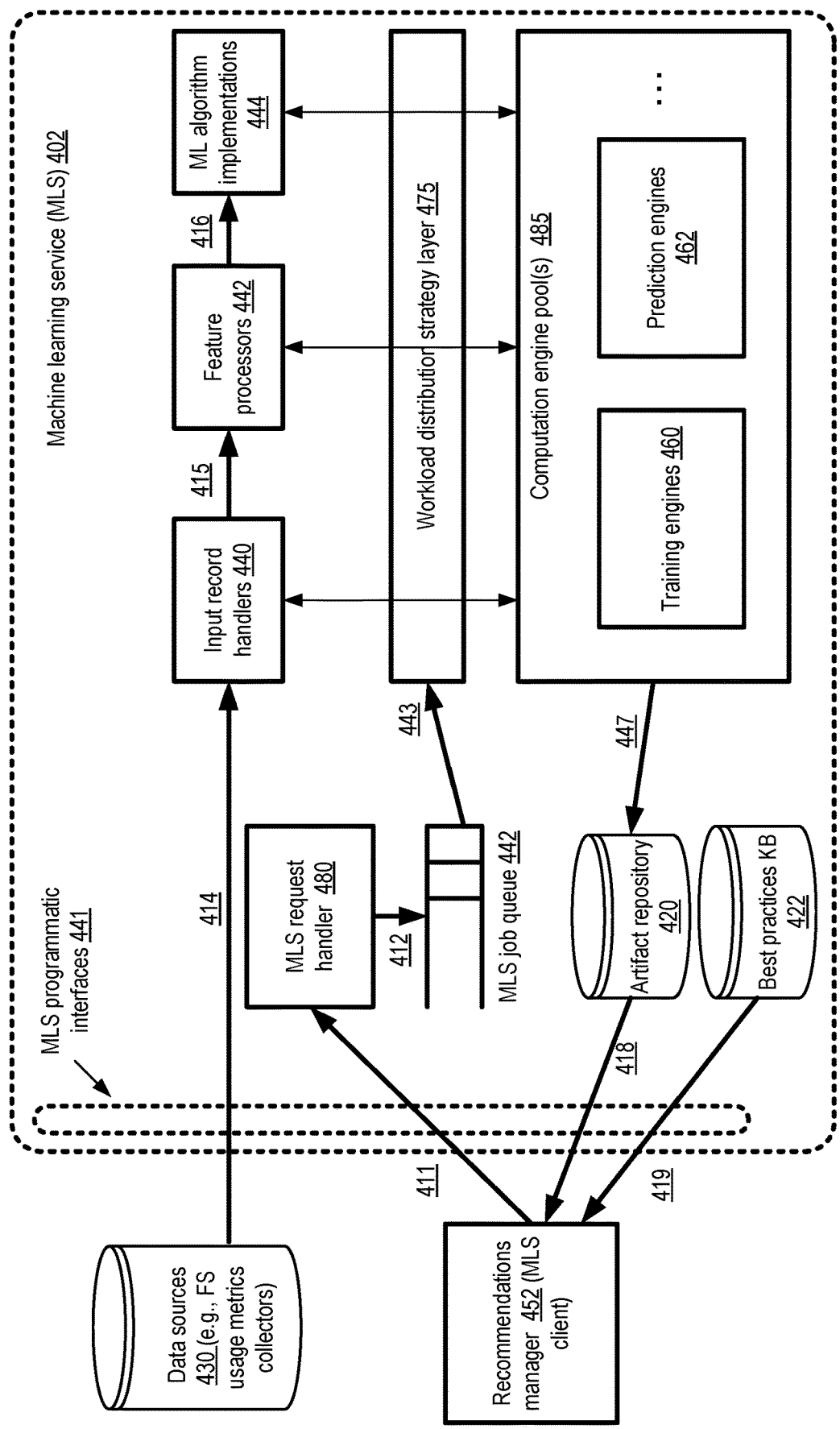
FIG. 4 illustrates an overview of components of a machine learning service which may be used by a recommendations manager of a file system service, according to at least some embodiments.

As mentioned above, in some embodiments the file system service may utilize resources of a machine learning service implemented at the provider network. FIG. 4 illustrates an overview of components of a machine learning service (MLS) which may be used by a recommendations manager of a file system service, according to at least some embodiments. An RM 452 may act as a client of the MLS 402 in the depicted embodiment. The MLS 402 may include a plurality of computation engines or servers organized into one or more pools 485, including, for example, training engines 460 and prediction engines 462. Training engines 460 may be used to develop, test and improve ML models, while prediction engines may be used to execute the trained models in the depicted embodiment. In other embodiments the same computation engines or servers may be used for both training and executing models. File system usage metrics may be received at the MLS via programmatic interfaces 441 from data sources 430 such as various types of metrics collectors affiliated with the file system service in the depicted embodiment. Any of a variety of programmatic interfaces may be used in different embodiments, such as APIs, command-line tools, web pages, or standalone GUIs.

In general, the programmatic interfaces 441 may also be used by clients to submit requests 411 for a variety of machine learning or statistics-related tasks or operations. The administrative or control plane portion of the MLS may include MLS request handler 480, which accepts the client requests 411 and inserts corresponding job objects into MLS job queue 442, as indicated by arrow 412. The control plane of the MLS 402 may comprise a plurality of components (including the request handler, workload distribution strategy selectors, one or more job schedulers, metrics collectors, and modules that act as interfaces with other services). The data plane of the MLS may include, for example, at least a subset of the servers of pool(s) 485, storage devices that are used to store input data sets, intermediate results or final results (e.g., model evaluation results of the kinds discussed above), and the network pathways used for transferring client input data and results.

Requests to train, test and/or execute ML models whose predictions are to be used for proactive recommendations at the file system service may be translated into one or more units of work called "jobs" in the depicted embodiment, with corresponding job objects being generated and stored in the job queue 442. Jobs may be removed from job queue 442 by a component of a workload distribution strategy layer 475, as indicated by arrow 413, and a processing plan may be identified for each such job. The workload distribution strategy layer 475 may determine the manner in which the lower level operations of the job are to be distributed among one or more computation engines selected from pool 485, and/or the manner in which the data analyzed or manipulated for the job is to be distributed among one or more storage devices or servers. After the processing plan has been generated and the appropriate set of resources to be utilized for the job has been identified, the job's operations may be scheduled on the resources. Results of some jobs may be stored as MLS artifacts within repository 420 in some embodiments, as indicated by arrow 447.

A client request 411 may indicate one or more parameters that may be used by the MLS to perform the operations, such as a data source definition (which may indicate a metrics collector), a feature processing transformation recipe, resource constraints of the kinds discussed above, or parameters to be used for a particular machine learning algorithm. Some machine learning workflows, which may correspond to a sequence of API requests from a client such as RM 452 may include the extraction and cleansing of input data records from raw data by input record handlers 440 of the MLS, as indicated by arrow 414. In at least some embodiments, the input data reaching the MLS may be encrypted or compressed, and the MLS input data handling machinery may have to perform decryption or decompression before the input data records can be used for machine learning tasks. For some types of machine learning requests, the output produced by the input record handlers may be fed to feature processors 442 (as indicated by arrow 415), where a set of transformation operations may be performed in accordance with various transformation recipes, e.g., using another set of resources from pool 485. The output 416 of the feature processing transformations may in turn be used as input for a selected machine learning algorithm 444, which may be executed using yet another set of resources from pool 485. A wide variety of machine learning algorithms may be supported natively by the MLS, including for example regression algorithms, classification algorithms including random forest algorithms, neural network algorithms, stochastic gradient descent algorithms, and the like. In at least one embodiment, the MLS may be designed to be extensible—e.g., clients such as the RM may provide or register their own modules (which may be specified as user-defined functions) for input record handling, feature processing, or for implementing additional machine learning algorithms than are supported natively by the MLS.

In the embodiment depicted in FIG. 4, the MLS may maintain a knowledge base 422 containing information on best practices for various tasks, including for example the kinds of file system optimizations tasks described above. Such knowledge base entries may be used, for example, to select suitable modeling methodologies, to select parameters such as time window sizes that work well for various types of file systems, and the like. Entries may be added into the best practices KB 422 by various control-plane components of the MLS, e.g., based on results of earlier operations, client feedback, and so on. In at least some embodiments, clients of MLS 402 such as the RM may be able to use programmatic interfaces 441 to access the KB 422 and/or the MLS artifact repository 420, as indicated by arrows 419 and 418. Leveraging the resources and infrastructure of a pre-existing MLS may enable the RM to generate high-quality recommendations more efficiently in various embodiments than may be possible if ML resources dedicated exclusively for file systems are used. In at least one embodiment, the RM itself may be implemented as a component of the MLS 402, and other control-plane components of the file system service may communicate with the RM via the MLS programmatic interfaces 441.

Clustering Approaches

Figure 5:
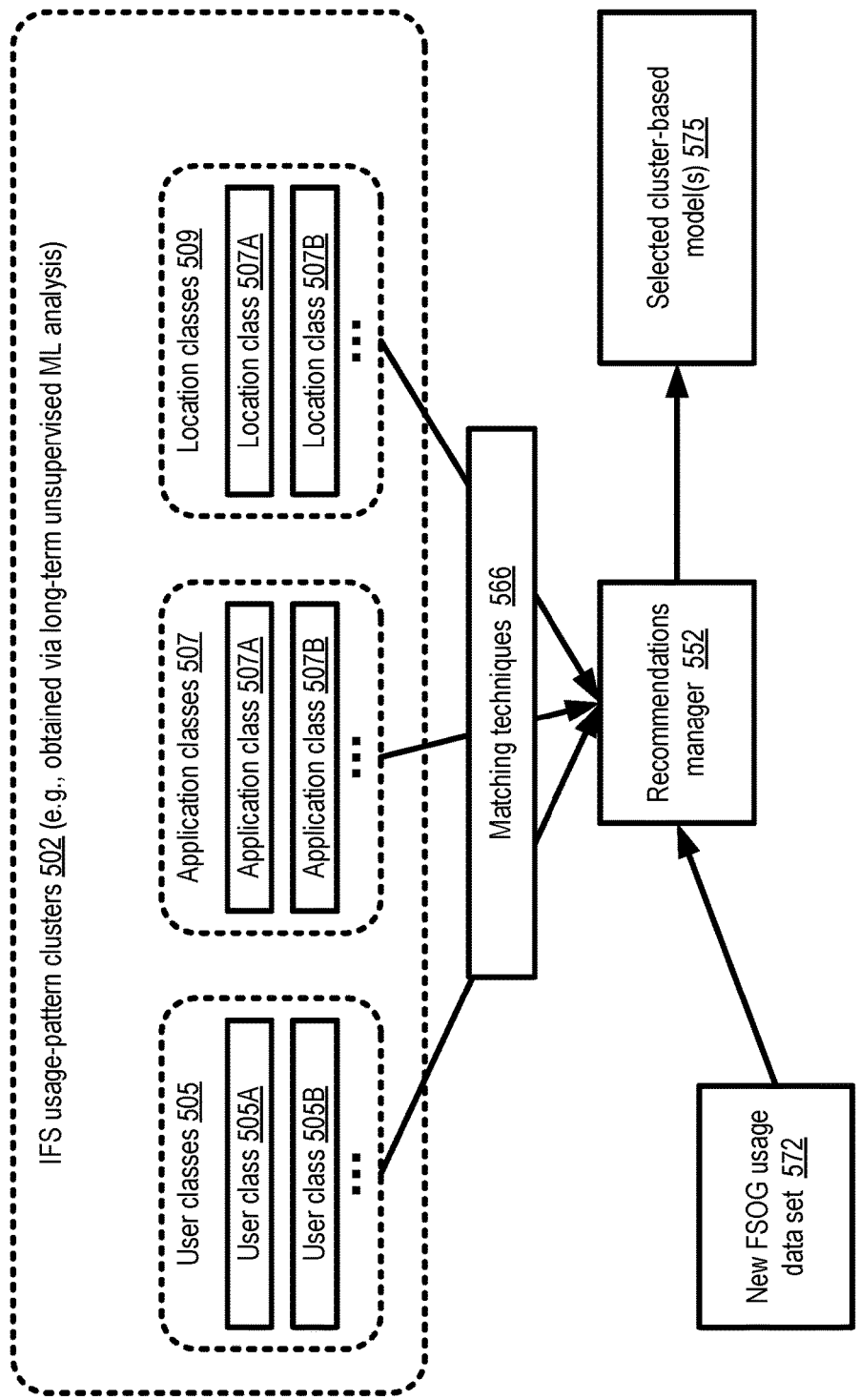
FIG. 5 illustrates an example of a use of a clustering technique for selecting machine learning models to be used for generating file system placement recommendations, according to at least some embodiments.

Over time, especially in embodiments in which an MLS of the kind described with respect to FIG. 4 is used by the RM, a rich knowledge base regarding file systems usage patterns associated with different entities may be accumulated. Such historical data, potentially generated over long periods of time, may be helpful in quickly selecting appropriate ML techniques for newly-created file system objects. Common file usage pattern categories associated with different types of users or clients, different applications, and even different requester locations may be generated, and information about which types of models or algorithms worked best for each category may be stored. FIG. 5 illustrates an example of a use of a clustering technique for selecting machine learning models to be used for generating file system placement recommendations, according to at least some embodiments.

In the embodiment shown in FIG. 5, a plurality of user classes 505 with respect to file system access patterns, such as user classes 505A and 505B, may be identified using unsupervised learning techniques. Similarly, at least some of the applications running at computing platforms for which the file system service is utilized may be placed into application classes 507, such as application classes 507A and 507B. The patterns of file system access requests generated at different locations (e.g., from which various data centers, cities, or countries) may be categorized, forming location classes 509, such as location class 509A and 509B. When a new file system is created or when a new set of file users comes online, the RM 552 may collect a new usage data set 572 (e.g., comprising metrics collected over a relatively short time period for a newly-identified FSOG) and use various matching techniques 566 to try to identify one or more of the IFS usage pattern clusters 502 to which the new usage data may be mapped in the depicted embodiment. If the pattern of accesses indicated by the new usage data set is sufficiently similar to the access patterns identified in one of the previously generated clusters 502, the particular models 575 and/or model parameters that led to the most accurate or useful predictions for that cluster may be selected for the new usage data set.

Accessibility Modes

Figure 6:
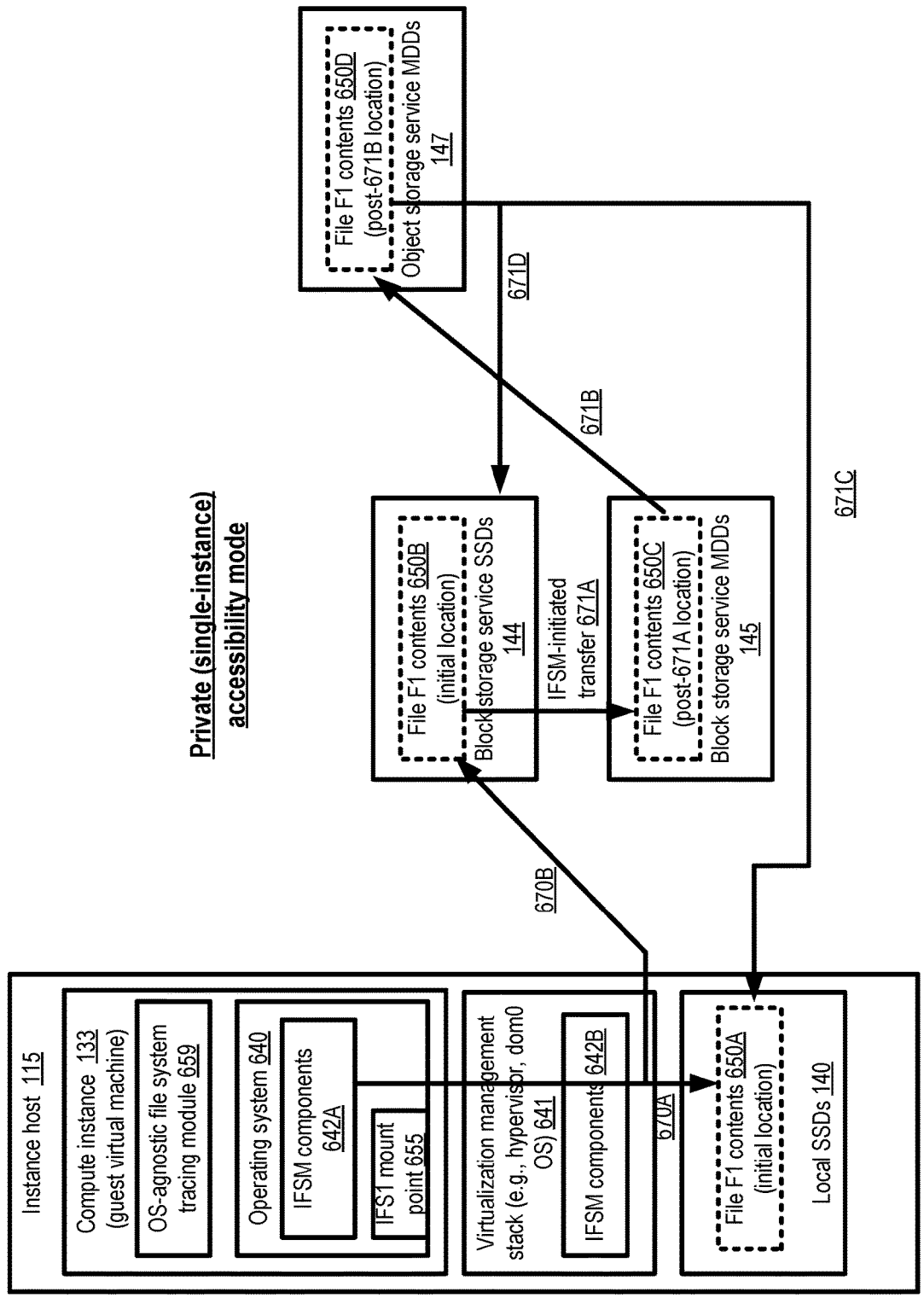
FIG. 6 illustrates an example of a private accessibility mode of a file system service, in which contents of file system objects are accessible from a single compute instance, according to at least some embodiments.

As mentioned earlier, several different accessibility modes may be supported by the file system service, and ML techniques may be applied to some subset or all of the modes. FIG. 6 illustrates an example of a private accessibility mode of a file system service, in which contents of file system objects are accessible from a single compute instance, according to at least some embodiments. As shown, compute instance 133 is implemented as a guest virtual machine at an instance host 115, and access to the contents of a file system is to be supported only for applications (or other software components) running at the compute instance 133. The IH 115 incorporates a virtualization management software stack 641, which may for example include a hypervisor and/or an administrative instance of an operating system running in a privileged domain (sometimes referred to as domain zero or dom0). In general, the virtualization management software stack may act as an intermediary between the compute instance 133 and hardware devices that are to be accessed from the compute instance—e.g., when a network packet is to be transmitted from instance 133 to some destination outside IH 115, the packet may be intercepted and/or encapsulated at a virtualization management component before it is passed to a network interface card which is to place the packet on a physical network link towards its destination. Similarly, the virtualization management software stack may act as an intermediary between the instance 133 and local storage devices such as SSDs 140 in the depicted embodiment.

In the depicted embodiment, an operating-system-agnostic file system tracing module 659 may be installed at the compute instance 133. The tracing module may collect the file system calls issued by various application-space components at the compute instance 133, and transmit them to the appropriate ML resources for ML model training purposes, clustering and the like. The operating system 640 that is used for the compute instance 133 may include one or more components of an IFSM 642A (as well as components of other file system types that may be supported for the compute instances, such as various traditional Linux-based file systems or traditional Windows-based file systems). In at least some embodiments, the virtualization management software stack 641 may also include IFSM components 642B. A mount point 655 (e.g., a directory within the compute instances root directory) may be established to attach the private mode intelligent file system IFS1 in the depicted embodiment. Since a private-mode intelligent file system is created for use from instance 133, the IFSM components resident at the IH 115 may typically select a local storage device of the IH such as an SSD 140 as the initial location for contents 650A of a file F1, as indicated by arrow 670A. In some cases, as discussed above, the recommendations generated by the RM (not shown) may guide the initial location for contents 650A. In some embodiments, in order to provide a level of fault tolerance which enables F1 to survive a crash of the CI 133 or IH 115, contents 650B of the file F1 may also be replicated to a block storage service SSD 144 in the depicted embodiment. Thus, in some embodiments, contents of a file may initially be replicated at two (or more) SDGs. In various embodiments, at least by default, the client may not be made aware that F1 is being replicated, and may not be informed regarding the particular type(s) of storage devices being used; instead, the client may simply be informed that a file F1 has been created as requested in the file system. In some implementations, one or more programmatic interfaces may be implemented to enable advanced users to determine the type(s) of storage devices being used for their file system objects.

After F1 has been created and its contents are stored at local SSDs 140 and BSS SSDs 144, usage metrics and other statistics regarding F1 may be collected in the depicted embodiment. Such metrics or statistics may be fed as input observation records to one or more machine learning models. The RM may determine, based at least in part on the predictions output by the model or models, to initiate the transfer 671A of F1 contents from their initial locations to magnetic disk drives (MDDs) 145 of the BSS. As a result, in some embodiments, F1 contents 650A and/or 650B may be deleted after they have been copied as F1 contents 650C at the MDDs. In other embodiments, F1 contents need not necessarily be deleted from their original locations for at least some period of time after a transfer. In a subsequent iteration of ML-based analysis, the RM may eventually recommend the transfer 671B of F1 contents from BSS MDDs 145 to OSS MDDs 147 in the depicted embodiment. If, after F1 has been transferred to the OSS MDDs, the RM predicts that F1 is likely to be accessed by a client in the near term, the contents of F1 may be transferred back to local SSDs 140 and/or BSS SSDs 144 in the depicted embodiment, as indicated by the arrows labeled 671C and 671D. It is noted that in other implementations of private accessibility mode, the initial locations for F1 and the manner or sequence of the transfers of the F1 contents may differ: for example, in one implementation, local MDDs rather than SSDs may be used as the initial locations of at least some types of file system objects. In some embodiments in which a given intelligent file system is to be accessed from a single host (e.g., either an instance host or an un-virtualized host), multiple software containers may be set up within a virtualized or un-virtualized operating system of the host, and respective mount points may be set up for the file system within each container. An example of container-based access to intelligent file systems is shown in FIG. 7 and described below in further detail.

Figure 7:
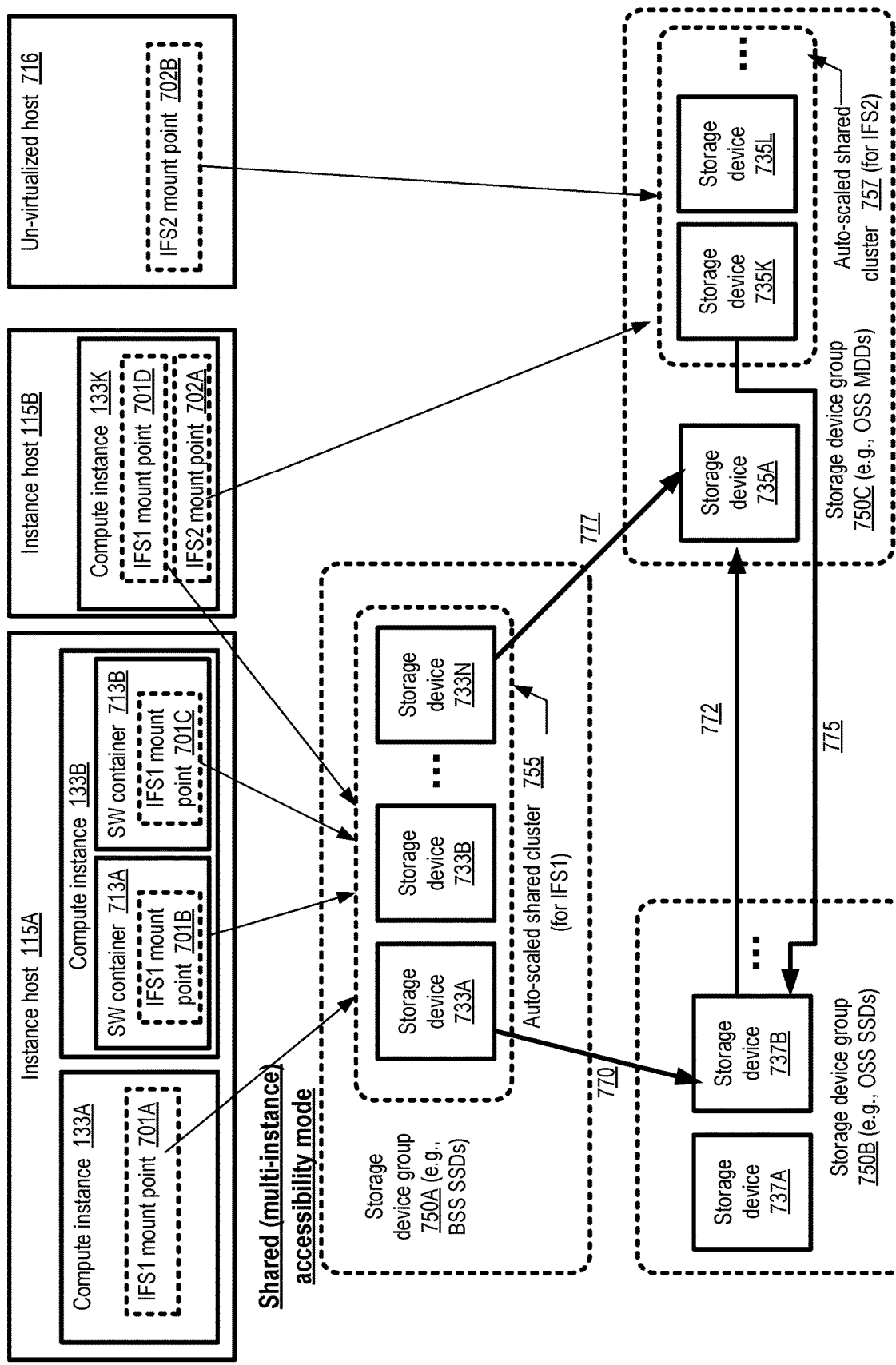
FIG. 7 illustrates an example of a shared accessibility mode of a file system service, in which contents of file system objects are accessible from a plurality of compute instances, according to at least some embodiments.

FIG. 7 illustrates an example of a shared accessibility mode of a file system service, in which contents of file system objects are accessible from a plurality of compute instances, according to at least some embodiments. Two intelligent file systems IFS1 and IFS2 are created in the depicted embodiment. IFS1 is to be accessed from at least three compute instances 133A, 133B and 133K, while IFS2 is to be accessed from at least two compute instances 133K and 133L. Compute instances 133A and 133B run at instance host 115A, while compute instances 133K and 133L run at a different instance host 115B. As shown, some compute instances such as 133B may include one or more software containers, such as containers 413A and 413B, from which various file systems such as IFS1 may also be independently accessed. In addition to instance hosts 115 that are used for virtualization of computing resources, the provider network may also include various un-virtualized hosts such as host 716 in the depicted embodiment, and the intelligent file systems may also be accessed from such un-virtualized hosts. An un-virtualized host may also include a plurality of software containers in at least some embodiments.

In the depicted embodiment a given intelligent file system instance may be configured to be accessed from multiple compute instances (and/or software containers 713) running at multiple instance hosts (as in the case of IFS1), or from some combination of compute instances and un-virtualized hosts (as in the case of IFS2). At least some of the compute instances, containers, and/or un-virtualized hosts may include a file system tracing module similar to module 659 shown in FIG. 6, which collects file system usage metrics for ML purposes. In some embodiments, each compute instance 133 or software container 713 may mount or logically attach a given file system such as IFS1 or IFS2 to a respective mount point (such as a directory established within the root file system of the instance), e.g., by issuing a mount command or its logical equivalent before reads and writes to the file system's objects can be issued. Thus, for IFS1, mount point 701A has been set up at instance 133A for IFS1, mount point 701B has been set up at container 713B of instance 133B, mount point 133 has been set up at container 713B of instance 133B, and mount point 701D has been set up at instance 133K. For IFS2, mount point 702A has been established at instance 133K, and mount point 702B has been set up at un-virtualized host 716. In general, any desired number of compute instances or containers distributed across one or more hosts may each set up any desired number of mount points to access respective intelligent file systems, in a manner similar to the way that conventional types of file systems may be mounted.

Different storage device groups may be selected as the initial locations for file system objects for IFS1 and IFS2 in the depicted embodiment, e.g., based on recommendations generated by an RM or based on policies unrelated to ML. In some embodiments, the selection of the initial locations may be guided or directed by client request parameters—e.g., a client may either directly indicate the types of storage devices that are to be utilized as the initial locations for the files of a given intelligent file system, or the client's requirements regarding data durability, availability or performance may indirectly lead the IFSM to select a particular storage device group. For IFS1, an auto-scaled shared cluster 755 comprising a plurality of storage devices of SDG 750A have been selected as the initial location, while for IFS1, auto-scaled shared cluster 757 comprising a plurality of devices of storage device group 750C has been identified as the initial location. The nodes of a cluster (such as devices 733A-733N of cluster 755, or devices 735K and 735L of cluster 757) may collectively implement partitioning of large file system objects in some embodiments—e.g., a large file may be split into respective partitions that are placed on some subset or all of the nodes. In at least one embodiment, a replication or redundancy technique (e.g., full replication of file system objects, replication combined with partitioning in a manner conceptually similar to the techniques used in various types of RAID devices (redundant arrays of inexpensive disks), or schemes such as erasure coding) may be used across the nodes of a cluster to achieve the desired level of data durability for a given IFS. In some implementations different nodes of a given cluster may be located in different data centers or different availability containers of the provider network. An availability container may represent a group of physical resources (such as hosts, network equipment, or storage devices) and associated infrastructure components (e.g., power supplies, heating and cooling systems, and the like) that have been engineered in such a way that a failure within one availability container does not lead to cascading or correlated failures at other availability containers. Replication and/or partitioning techniques may be used for private-mode intelligent file systems as well in at least some embodiments. It is noted that shared accessibility mode may not always require a cluster of storage nodes to be used—e.g., a given shared file system may be set up at a single storage device and accessed from multiple compute instances in at least some embodiments.

In some embodiments, a concurrency control mechanism may be implemented at the file system level by an IFSM, so that for example file system object contents are maintained at a desired level of consistency despite the possibility of concurrent or near-simultaneous update requests from several different instances 133. In the depicted embodiment, the clusters 755 and 757 may be designated as being "auto-scaled" in that nodes may automatically be added to or removed from clusters 755 and 757 (e.g., by the IFSM in response to recommendations generated by the RM) based on measured workloads or the aggregate sizes of the objects within a given file system. In some embodiments in which partitioning is used for large file system objects in combination with auto-scaling, at least some objects may be automatically and transparently (e.g., without specific repartitioning requests from clients) repartitioned by the IFSM when nodes are added or removed from the file system.

As in the case of intelligent file systems set up in the private accessibility mode, the contents of various file system objects of shared mode file systems such as IFS1 or IFS2 may be transferred transparently and without specific client-provided instruction among different storage device groups in the depicted embodiment. Thus, for example, contents of files stored at storage device 733A of SDG 750A may be moved to storage device 734B of SDG 750B (as indicated by arrow 770) based at least in part on recommendations made by an RM. From storage device 734B, contents of one or more of the files may be moved again, e.g., to storage device 735A of SDG 750C as indicated by arrow 772. Some file system objects may be moved directly from SDG 750A to 750C as indicated by arrow 774, e.g., instead of first being moved to SDG 750B and then later being moved to SDG 750C. Contents of IFS2 objects may be moved from their initial location in SDG 750C to new locations in SDG 750B in the depicted embodiment, as indicated by arrow 775.

Web-Based Interface for Client Preferences

Figure 8:
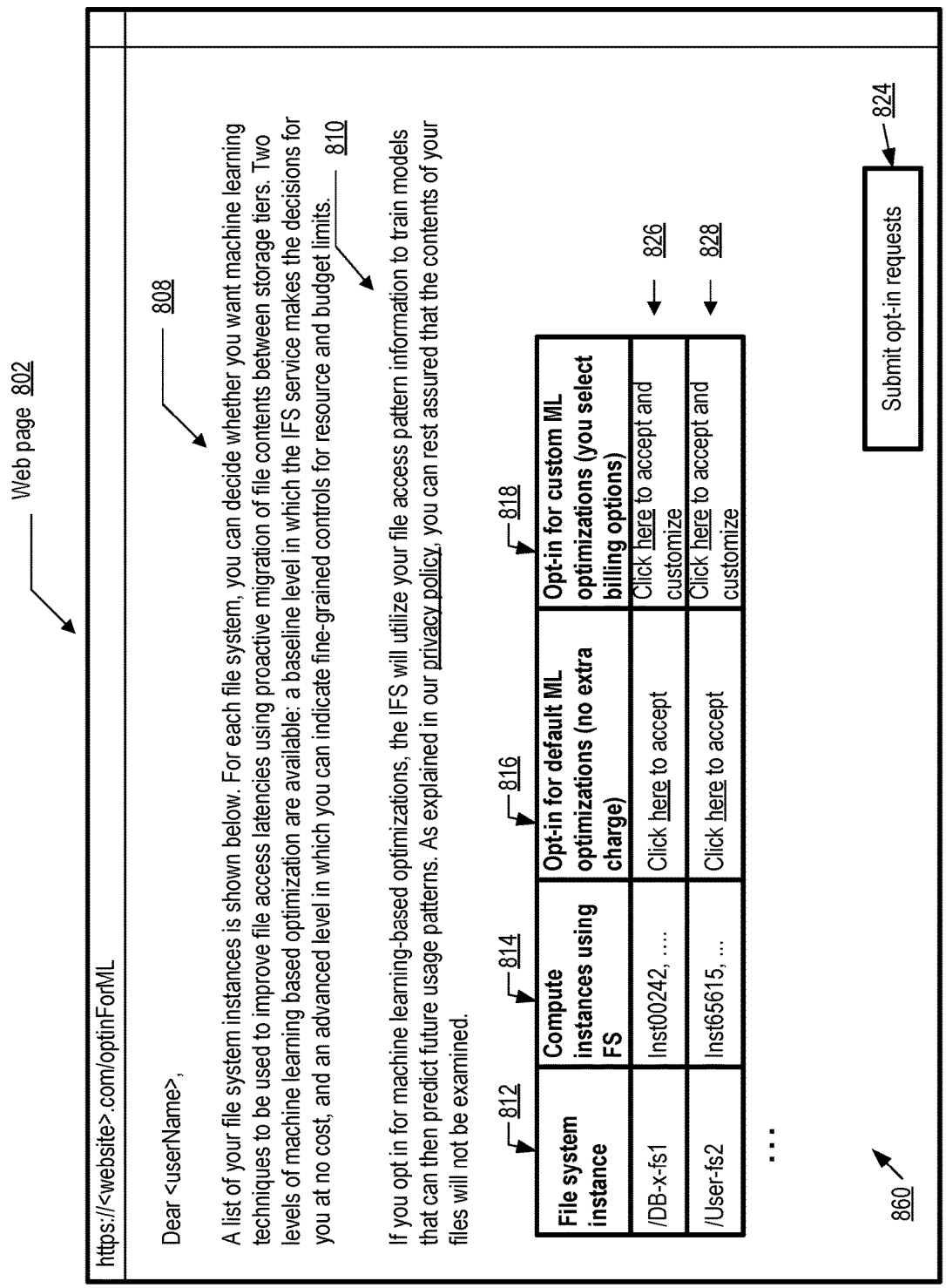
FIG. 8 illustrates an example web-based interface which may be used by clients of a machine learning service to indicate preferences regarding machine learning based optimizations, according to at least some embodiments.

FIG. 8 illustrates an example web-based interface which may be used by clients of a machine learning service to indicate preferences regarding machine learning based optimizations, according to at least some embodiments. The interface may include a web page 802 with message regions 808 and 810 and a table 860 listing various file system instances set up on behalf of a particular client of the file system service. Web page 802 may be implemented as part of a management console provided for administrative tasks to clients of the file system service in at least some embodiments. In the example shown in FIG. 8, region 808 provides high-level guidance regarding two broad levels of ML-based optimizations that are supported for file system objects: a default or baseline level for which clients do not have to pay extra (beyond what they would already be billed for the establishment and use of the file system), and a custom or advanced level in which clients may indicate more detailed requirements or constraints. In the depicted embodiment, clients may be charged extra for using the advanced level of ML optimizations. In region 810, the client is advised that the ML techniques will rely on the file access patterns of the client, but that the content of the files will not be examined.

Each row of table 860 corresponds to a particular file system instance indicated in column 812 (e.g., row 826 for a file system identified as "/DB-X-fs1" and row 828 for a file system identified as "/User-fs2"). A list of compute instances that are configured to access the file system is provided in column 814. For each file system instance, the client may click on a link in column 816 to indicate that the default level of ML-based optimizations, or on a link in column 818 to choose the custom level and provide further details regarding the requested customizations. In the depicted embodiment, if a client does not wish to have ML-based optimization performed at all, they need not take any explicit action—that is, without explicit client opt-in request, ML optimizations may not be performed. The submit button 824 may be used to send all the client's opt-in requests (if any) to the file system service control-plane. In at least some embodiments, an interface element that allows clients to explicitly opt out of the recommendations may be provided. Using such an element, for example, a client who initially opted in for proactive recommendations may later reverse that decision. In some embodiments, clients may be provided with interfaces that distinguish between at least two levels of sharing of metrics derived from the clients' accesses for machine learning purposes. In a first level, a client C1 who opts in for recommendations may indicate that the metrics that are collected from C1's operations may be used by the recommendations manager in an unrestricted manner, e.g., by adding the metrics to a global pool of metrics whose analysis can be used for the benefit of other clients such as a different client C2. In a second level of metrics sharing, C1 may indicate a preference for a more restricted use of the metrics generated from C1's operations—e.g., that such metrics should be used only for recommendations made on behalf of of C1 alone (or for recommendations of some set of clients indicated by C1). In at least one embodiment, higher-level preferences of a client may be obtained using a programmatic interface similar to that shown in FIG. 8—e.g., a client may indicate whether they prioritize performance above cost, or their relative priorities associated with various service characteristics such as response time, throughput, availability, data durability and cost. Such higher-level preferences may then be used by the file system manager to infer or deduce whether statistical techniques such as machine learning are to be used to generate proactive recommendations of the kinds described herein. In some embodiments, other programmatic interfaces (such as application programming interfaces (APIs), command-line tools, standalone graphical user interfaces and the like) may also or instead be used to indicate client preferences regarding the use of ML-based optimizations. In at least one embodiment, clients may be able to programmatically specify ML-related preferences at granularities other than complete file systems—e.g., using an interface similar to that shown in FIG. 8, a new row may be created for the contents of a particular directory within a file system, or for a specific file.

Methods for Utilizing Machine Learning at Multi-Tier File Systems

FIG. 9 is a flow diagram illustrating aspects of operations that may be performed by a recommendations manager of a file system service which implements automated transfers of file system objects across storage device groups, according to at least some embodiments. As shown in element 901, a number of file systems may be created and populated at a file system service (FSS) of a provider network using a plurality of storage device groups which may differ from one another in various characteristics such as performance, cost and the like. The administrative components of the FSS (including, for example, a recommendations manager, various object migrators, or one or more other components of a file system manager) may be distributed across various resources of the provider network, including for example dedicated control-plane servers, instance hosts at which compute instances are implemented, and/or components of a machine learning service.

Members of one or more file system object groups (FSOGs) for which proactive placement recommendations are to be generated using ML techniques may be identified (element 904). FSOG boundaries may be determined based on a number of different criteria in various embodiments. An FSOG may include, for example, all the objects within a given file system or a set of file systems, file system objects created on behalf of a particular client, the set of file systems accessible from a selected group of compute instances, and so on. In some embodiments, clients may indicate FSOGs using programmatic interfaces of the kind shown in FIG. 8. In at least some embodiments, resource constraints may be enforced with respect to ML operations—e.g., the amount of computational cycles, storage or memory to be consumed in an effort to optimize the placement of file contents of a given FSOG may be limited based on factors such as implicit or explicit budget goals, the identity of the client, the size of the FSOG, the billing amounts generated for use of the FSOG, the available computing capacity at a machine learning service, and so on. The set of resource constraints (if any) to be applied for each of the FSOGs may be determined (element 907).

In at least some embodiments, ML techniques may be applied iteratively for each FSOG, e.g., new recommendations may potentially be generated once every X minutes or every X hours. In each iteration for each FSOG, a set of usage metrics may be collected for one or more ML models (element 910). In at least some embodiments, a sliding window technique may be used to select the set of metrics to be used as observation records for the ML models—e.g., only metrics collected during the last K minutes may be used. In one embodiment, the metrics may be assigned weights based on how recently they were collected—e.g., metrics collected during the most recent ten minutes may be assigned a higher weight than metrics collected more than an hour ago. Any of various types of ML modeling techniques may be selected in different embodiments, including regression, classification and/or time series models. The selected models may be trained and tested using the collected metrics (element 913), and predictions regarding the timing and nature of future accesses may be obtained from the trained models (element 916). In some cases, several different sets of models may be used to obtain predictions for a given file object, as discussed in the context of FIG. 3 above. Using the predictions obtained from the model(s), any of a number of different types of recommendations may be generated (element 919), including recommendations to move file contents from one SDG to another, recommendations for initial placement of new file contents, and/or recommendations to transfer applications from one execution platform to another. In at least some implementations, some of the recommendations may be directed to portions of large files rather than to entire files—i.e., the scope of the recommendations may not necessarily coincide with file boundaries. The recommendations may be transmitted to various control-plane entities for implementation (element 922)—e.g., to object migrators of the file system service, to application migrators, and so on. In the next iteration of recommendation generation, operations corresponding to elements 910 onwards may be repeated. Of course, over time, new FSOGs may be added, or existing FSOGs may be decommissioned by the clients on whose behalf they were created, in which case the operations corresponding to elements 901, 904 and/or 907 may be repeated as well.

It is noted that in various embodiments, operations other than those illustrated in the flow diagram of FIG. 9 may be used to implement at least some of the techniques for supporting intelligent file systems at which automated ML-based transfers of file system contents are supported. Some of the operations shown may not be implemented in some embodiments, may be implemented in a different order than illustrated in FIG. 9, or in parallel rather than sequentially.

Use Cases

The techniques described above, of implementing an intelligent file system framework which uses machine learning to optimize the placement of file system objects across the variety of storage-related capabilities and storage device types that may be available in cloud computing environments, may be useful in a variety of scenarios. As more and more storage related services and features become available at provider networks, it may become harder for customers of the provider network to make optimal decisions about exactly where their files should be stored. At least some customers may prefer to rely on the provider network operators to make the right choices about file locations, especially if the choices are based on proven ML techniques. As long as specified constraints regarding performance, durability, availability and pricing are met, the customer may let the file system management infrastructure implemented at the provider network make low-level decisions regarding file placements and transfers. Such an approach may help reduce overall costs for the clients, and may also enable the provider network to better utilize the mix of storage devices that are available.

Illustrative Computer System

Figure 10:
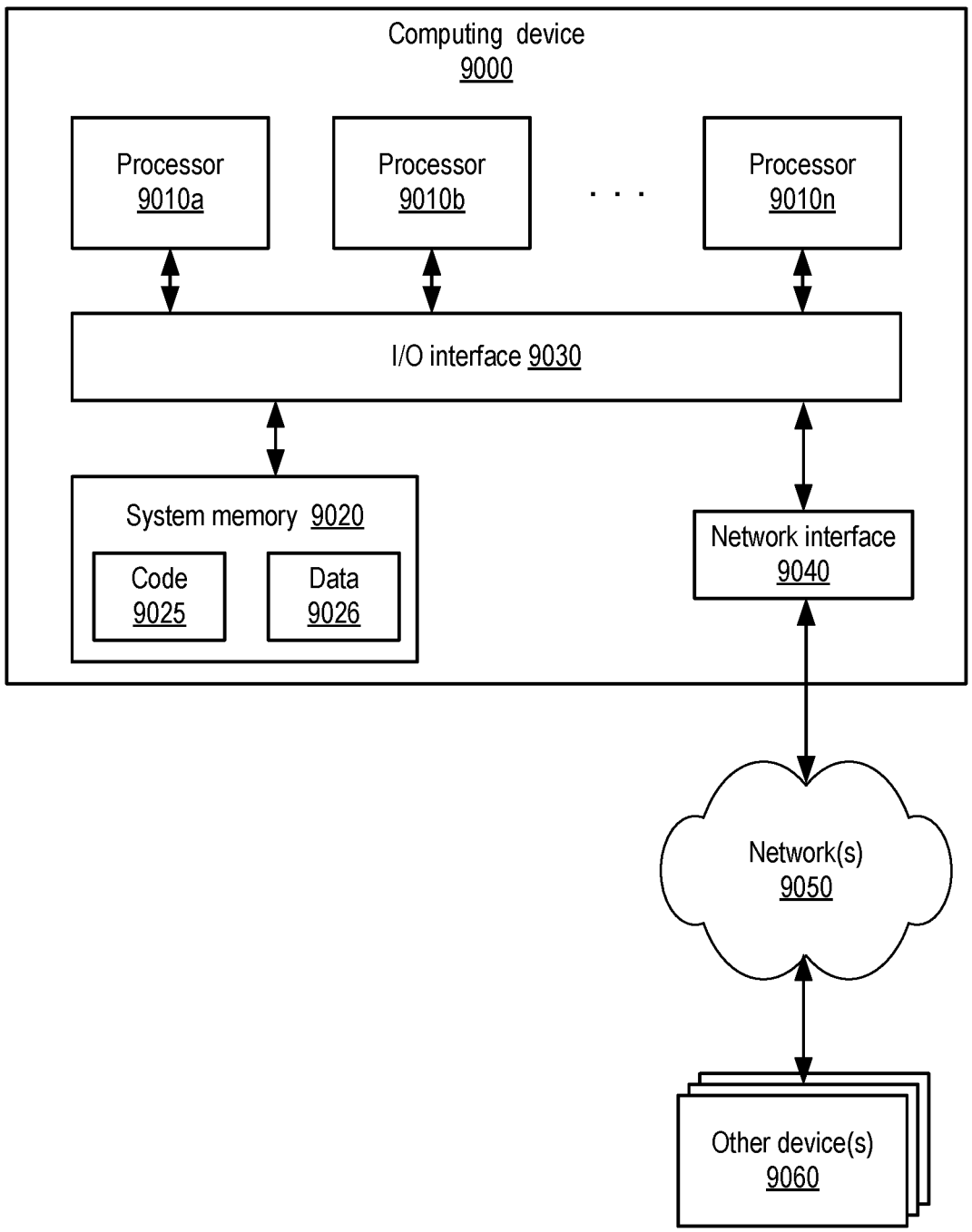
FIG. 10 is a block diagram illustrating an example computing device that may be used in at least some embodiments.

In at least some embodiments, a server that implements one or more of the techniques described above for supporting intelligent file systems at which machine learning techniques are used to initiate transfers of objects between storage device groups may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
 a recommendations manager of a storage service, implemented at one or more computing devices, wherein the recommendations manager is configured to:
  train one or more machine learning models, including a first machine learning model, using a first collection of usage metrics of a first storage object group;
  generate, based at least in part on one or more predictions obtained from the first machine learning model, a particular proactive placement recommendation to transfer a particular storage object of the first storage object group from a first storage device group of the storage service to a different storage device group; and
  transmit the particular proactive placement recommendation to an object migrator component of the storage service configured to initiate the transfer of the particular storage object.

2. The system as recited in claim 1, wherein the recommendations manager is further configured to:
 determine a first constraint on machine learning resources of a provider network to be used to generate one or more proactive placement recommendations for the first storage object group, including the particular proactive placement recommendation, wherein the training of the first machine learning model is performed using resources selected in accordance with the first constraint.

3. The system as recited in claim 2, wherein the first constraint is based at least in part on one or more of: (a) an identity of a client on whose behalf the first storage object group is created, (b) a size of the first storage object group, (c) an analysis of billing records associated with the first storage object group, (d) an available computing capacity at a machine learning service implemented at the provider network.

4. The system as recited in claim 2, wherein the recommendations manager is further configured to:
generate an additional set of proactive placement recommendations for the first storage object group using a set of resources selected in accordance with a different constraint, wherein the different constraint is determined by the recommendations manager subsequent to determining the first constraint.

5. The system as recited in claim 1, wherein the first machine learning model implements a first modeling methodology selected from a methodology set comprising: (a) regression, (b) classification or (c) time series modeling.

6. The system as recited in claim 1, wherein the recommendations manager is further configured to:
classify, using a clustering model, users of the first storage object group into a plurality of categories based at least in part on respective storage access patterns of the users, wherein the particular proactive placement recommendation is based at least in part on a result of the clustering model.

7. The system as recited in claim 1, wherein the recommendations manager is further configured to:
receive, via a programmatic interface of the storage service, an indication from a client of one or more storage objects for which the client has opted in for proactive placement recommendations;
identify, based at least in part on the one or more storage objects for which an indication was received from the client, one or more storage object groups for which respective sets of proactive placement recommendations are to be generated using one or more machine learning models, including the first storage object group.

8. A method, comprising:
performing, by a recommendations manager (RM) of a storage service:
training one or more machine learning models, including a first machine learning model, using a first collection of usage metrics of a first storage object group;
generating, based at least in part on one or more predictions obtained from the first machine learning model, a particular proactive placement recommendation to transfer a particular storage object of the first storage object group from a first storage device group of the storage service to a different storage device group; and
transmitting the particular proactive placement recommendation to an object migrator component of the storage service configured to initiate the transfer of the particular storage object.

9. The method as recited in claim 8, further comprising:
determining, by the RM, a first constraint on machine learning resources of a provider network to be used for generating one or more proactive placement recommendations for the first storage object group, including the particular proactive placement recommendation, wherein the training of the first machine learning model is performed using resources selected in accordance with the first constraint.

10. The method as recited in claim 9, wherein the first constraint is based at least in part on one or more of: (a) an identity of a client on whose behalf the first storage object group is created, (b) a size of the first storage object group, (c) an analysis of billing records associated with the first storage object group, (d) an available computing capacity at a machine learning service implemented at a provider network.

11. The method as recited in claim 9, further comprising:
generating, by the RM, an additional set of proactive placement recommendations for the first storage object group using a set of resources selected in accordance with a different constraint, wherein the different constraint is determined by the recommendations manager subsequent to determining the first constraint.

12. The method as recited in claim 8, wherein the first machine learning model implements a first modeling methodology selected from a methodology set comprising: (a) regression, (b) classification or (c) time series modeling.

13. The method as recited in claim 8, further comprising performing, by the RM:
classifying, using a clustering model, users of the first storage object group into a plurality of categories based at least in part on respective storage access patterns of the users, wherein the particular proactive placement recommendation is based at least in part on a result of the clustering model.

14. The method as recited in claim 8, further comprising performing, by the RM:
receiving, via a programmatic interface, an indication from a client of one or more storage objects for which the client has opted in for proactive placement recommendations;
identifying, based at least in part on the one or more storage objects for which an indication was received from the client, one or more storage object groups for which respective sets of proactive placement recommendations are to be generated using one or more machine learning models, including the first storage object group.

15. One or more non-transitory computer-readable storage media storing program instructions that when executed on or across one or more processors implements a recommendations manager (RM) of a storage service, wherein the recommendations manager is configured to:
train one or more machine learning models, including a first machine learning model, using a first collection of usage metrics of a first storage object group;
generate, based at least in part on one or more predictions obtained from the first machine learning model, a particular proactive placement recommendation to transfer a particular storage object of the first storage object group from a first storage device group of the storage service to a different storage device group; and
transmit the particular proactive placement recommendation to an object migrator component of the storage service configured to initiate the transfer of the particular storage object.

16. The one or more non-transitory computer-readable storage media as recited in claim 15, wherein the RM is further configured to:
determine a first constraint on machine learning resources of a provider network to be used to generate one or more proactive placement recommendations for the first storage object group, including the particular proactive placement recommendation, wherein the training of the first machine learning model is performed using resources selected in accordance with the first constraint.

17. The one or more non-transitory computer-readable storage media as recited in claim 16, wherein the first constraint is based at least in part on one or more of: (a) an identity of a client on whose behalf the first storage object group is created, (b) a size of the first storage object group, (c) an analysis of billing records associated with the first storage object group, (d) an available computing capacity at a machine learning service implemented at the provider network.

18. The one or more non-transitory computer-readable storage media as recited in claim 16, wherein the recommendations manager is further configured to:
generate an additional set of proactive placement recommendations for the first storage object group using a set of resources selected in accordance with a different constraint, wherein the different constraint is determined by the recommendations manager subsequent to determining the first constraint.

19. The one or more non-transitory computer-readable storage media as recited in claim 15, wherein the first machine learning model implements a first modeling methodology selected from a methodology set comprising: (a) regression, (b) classification or (c) time series modeling.

20. The one or more non-transitory computer-readable storage media as recited in claim 15, wherein the recommendations manager is further configured to:
receive, via a programmatic interface, an indication from a client of one or more storage objects for which the client has opted in for proactive placement recommendations;
identify, based at least in part on the one or more storage objects for which an indication was received from the client, one or more storage object groups for which respective sets of proactive placement recommendations are to be generated using one or more machine learning models, including the first storage object group.

\* \* \* \* \*